Figure 1:
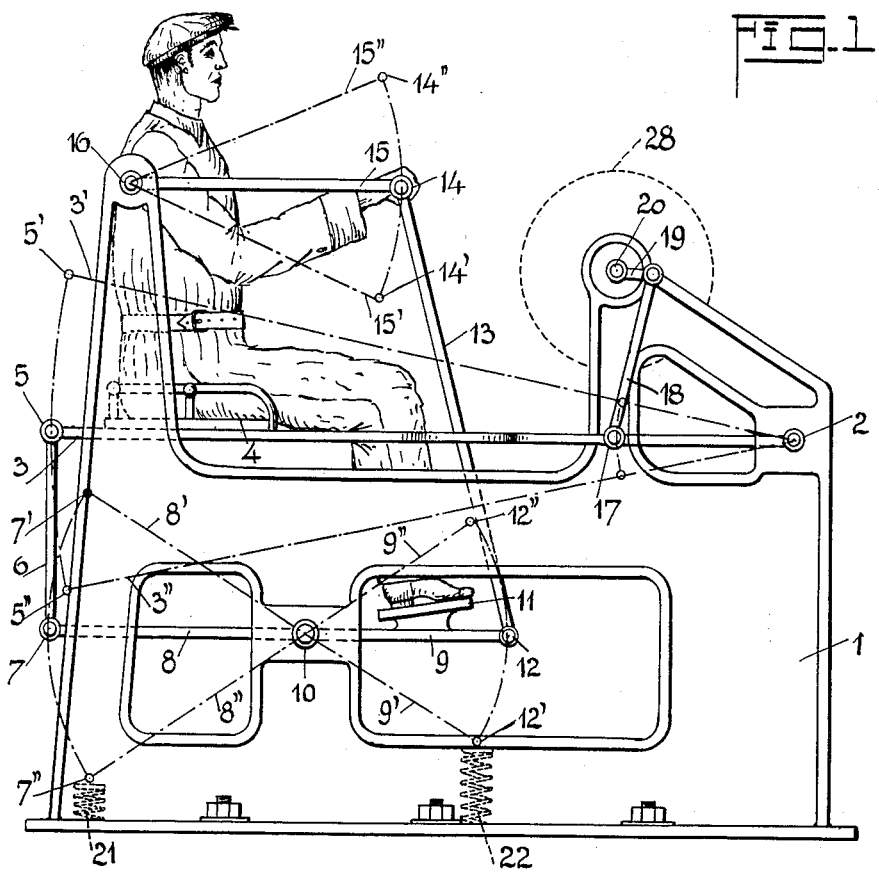

Nov. 7, 1933.     P. BRETTRÄGER     1,933,654
DRIVING DEVICE OPERATED BY THE WEIGHT AND MUSCULAR FORCE OF THE HUMAN BODY

Filed June 9, 1930

Inventor
Peter Bretträger
By B. Singer, Atty.

UNITED STATES PATENT OFFICE 1,933,654

DRIVING DEVICE OPERATED BY THE WEIGHT AND MUSCULAR FORCE OF THE HUMAN BODY

Peter Brettträger, Budapest, Hungary

Application June 9, 1930. Serial No. 460,067

1 Claim. (Cl. 185—1)

My invention relates to driving devices operated by human force, in which, contrary to earlier devices based on the use of the muscular force of the arms or legs alone, permitting one to utilize human force in a one-sided manner and to a very limited extent only, and causing a great deal of fatigue, the whole weight of the human body as well as its whole muscular force, if possible, are utilized. Such devices as exist up to the present, in which the whole of the human body is employed for the driving of machinery comprises substantially a lever arm on which a seat is provided, lever arms supporting the limbs, a system of links mutually connecting all these lever arms, and a driving shaft, connected with one of the levers, arranged so as to ensure that the work done by the alternately raised and lowered body or by the several limbs respectively shall be mutually united and transmitted to the driving shaft.

Existing devices of this kind have not, however, proved successful in actual practice, having been unsatisfactory from a point of view of design as well as from the point of view of efficient operation. Their drawbacks from the point of view of design were that the various lever arms, those carrying the seat and those supporting the several limbs, as well as the links of the transmission device effecting the transmission of power to the driving shaft and finally the driving shaft itself were arranged one behind the other in the longitudinal direction of the device, this arrangement resulting in an excessive total length of the construction, rendering its employment for the driving of vehicles for example, impossible in practice. In addition thereto, although the purpose aimed at in the design of the device was to utilize the force of the whole human body, the actual work done by the device was nevertheless very limited, if only for the reason that the leverage of the lever arm carrying the seat and therewith the working stroke—forming an arc—of the seat, or respectively of the weight of the trunk of the body was too short and an increase of the length of this leverage appeared to be practically impossible owing to the total length of construction of the device being, as mentioned, too long already, even without such an extension.

These drawbacks are eliminated according to the invention by arranging the lever arms carrying the seat and supporting the various limbs, and also the transmission device transmitting the power to the driving shaft and, finally, the driving shaft itself, in such a manner, that all these parts will be comprised in the space above and below the length of the lever arm carrying the seat (or, in short, of the seat lever arm). The design thus resulting is much more compact than that of the known devices, taking up a very small amount of space only, particularly in the direction parallel to the longitudinal centre-line of the device. In addition thereto, the various parts of the device are arranged in such a manner, as to ensure that among the working strokes of the various lever arms supporting the various parts of the body, the working stroke forming an arc of the seat lever should be the largest, resulting not only in the weight of the body and the force of the whole body being completely utilized for performing work, but also in replacing the one-sided driving of handles or foot pedals, rapidly causing fatigue, by a method of work incomparably more satisfactory from a hygienic point of view, and comprising much greater variety, owing to the fact that the body, alternately rising and being lowered, has an opportunity of stretching itself completely and is thus able to utilize the force of nearly all its muscles. For this reason the device according to the invention is suitable not only for being employed as a driving device proper, but also as an apparatus for gymnastic exercise.

This effect, i. e. the particular method of exertion, which comprises great variety, and enables the load of work to be distributed in a very advantageous manner over the whole of the human body, and while being very rapid, nevertheless causes very little fatigue, is, according to the invention, further increased by the fact, that next to the working-stroke of the seat lever arm, which, as mentioned, is the longest among all the working strokes of the levers, the working stroke of the links supporting the arms is the next longest, and that of the foot pedal is, relatively, the shortest. This arrangement enables the manner of performing the work to be adapted in a novel and highly advantageous manner to the characteristics of the human body as defined by anatomy.

The drawing illustrates embodiments of the invention, shown by way of example.

Figure 2:
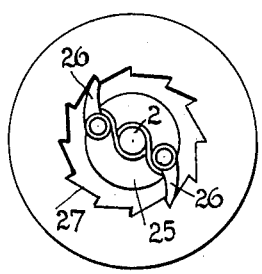

Fig. 1 is a diagrammatic side elevation of the whole arrangement of the driving device. Fig. 2 illustrates a detail, viz a different method of transmitting the power to the driving shaft.

The supporting structure 1 composed of two mutually parallel flanks shaped as shown and of transverse parts (not shown on the drawing) mutually connecting these two flanks and ensuring the rigidity of the structure, carries, first of all, a shaft 2 supported in bearings fixed in this frame. A lever arm or frame 3 is arranged to pivot around the said shaft. The lever arm 3 which carries a seat 4, is linked, by means of links 5, with a bar 6, the latter being linked, by means of pivots 7 to a doublearm-lever 8, 9 which latter is arranged so as to pivot around a shaft 10, supported in bearings fixed in the supporting structure 1. The right-hand lever arm 9 of the double-arm lever 8, 9 carries a foot rest 11 and is linked at the point 12 to a bar 13, this latter again being linked at the point 14 to links 15, arranged pivotally around a shaft 16 supported in bearings fixed in the supporting structure 1. The right-hand transverse bar of the links 15, which runs at right-angles to the plane of the drawing, and mutually connects the links 14, serves as a support for the hands or arms of the operator. Finally, any chosen point of the system of links and levers, say, for instance, point 17 of the links 5 is connected, by means of a connecting rod 18 and a crank 19 with a shaft 20 supported in bearings fixed on the supporting structure 1, which shaft may, for instance, carry the rope drum 28 of a winch.

Although the device described, arranged for being moved alternately in upward and downward directions, works with strokes of a definite length, preferably shock damping devices are provided, in fixed positions at the ends of the travel path of one or more points of the lever arms or of the system of connecting levers 6, 8, 13, for instance at points 21 and 22 on the supporting structure 1 for the purpose of damping any shocks which might occur.

The device described operates in the following manner:

Fig. 1 illustrates the device in its middle position, into which the device has come, say, from its top position, in which the lever arm 3 carrying the seat 4 had been occupying the position 3' shown in dashed and dotted lines. In this last-named position the whole weight of the operator bears on the seat 4, the arms and legs of the operator being at rest,—seat 4—under the action of this weight being moved downwardly, together with its lever arm 3, which is thus deflected downwardly around shaft 2, this lever arm 3 finally reaching the extreme bottom position marked 3''. During this movement the crank or crank disc 19 has performed half a revolution clockwise, starting from a top position, and passing through the middle position shown on the drawing. While the lever arm 3 is being lowered, the arm 9 carrying the foot-rest 11 will simultaneously swing into the top position 9'' under the action of the bars 6, 8 and similarly, the lever arm 15 carrying the hand or arm support will swing into the top position 15'' under the action of arm 9 and of the connecting bar 13. Immediately after this has been done the operator will rise from seat 4 and forcefully press down lever arm 15 by aid of his arms, while at the same time also forcefully pressing down lever arm 9 by aid of his feet. In this work the momentum of the weight of the operator's body also takes an effective part, the operator, when rising from the seat 4, altering the position of the centre of gravity of his body by transferring it towards the right of the vertical plane passing through the shafts 10. During this time the crank mechanism 18, 19 performs the next (left-hand side) half-revolution, and the lever arm 3, carrying the seat 4, which latter is now unoccupied, automatically reaches under the action of the connecting bars 8 and 6 the oblique position 3', following which the operator again sits down. This cycle of operations is then repeated again, and so on.

It should be remarked that the link arms 15 may be arranged so as not only to support the bar, used as a hand support, mutually connecting the links 14, but also to serve as arm rests themselves, it being thus possible to provide for the lower part of the arms or the hands or both the lower part of the arms and the hands to take part in the work described.

Instead of a crank mechanism, any other kind of mechanism suitable for converting alternating motion into rotary motion, as e. g. the device, per se as illustrated in Fig. 2, comprising ratchets and pawls may also be used. Accordingly the transmission of power may, in this case, be effected direct to the shaft 2, a connecting rod, like 18, being not required in this case. In the case of this arrangement, shaft 2 is surrounded by a ratchet wheel 27 with inside toothing, which ratchet wheel may, for instance, be connected with the rope drum of a lifting device, and the hub of which as well as the hub of the rope drum sit loosely on shaft 2. A disc 25 is keyed on shaft 2, which disc carries pawls 26. This mechanism is arranged in such a manner, that during the time during which the lever arm 3 swings downward under the action of the weight of the operator's body, the pawls 26 pass the teeth of the ratchet wheel 27 ineffectually, while during the time of the downward stroke of the lever arms 15 and 9, the pawls engage with the teeth of the ratchet wheel and thereby effect a partial rotation of the driving shaft 2. In order to effect the continuous rotation of the shaft in one direction, two or more driving devices, according to the invention, connected to two or more ratchet wheels, are provided.

The driving device according to the invention may be used for the most varied purposes, particularly for the driving of mechanical implements, as e. g. conveyors, lifting devices or agricultural machinery (for instance maize grinding mills, straw choppers etc.) as well as for the propulsion of vehicles, as e. g. boats, perambulators of larger size, railway line inspection trolleys, bicycles, particularly also of vehicles for the transport of persons and goods. The device may also be employed as an apparatus for gymnastic exercise, i. e. without driving any vehicle or mechanical implement, in which case it enables bodily exercises of a kind very beneficial for the human organism to be performed, and presents a very important novelty in this respect, without transmission of power to any mechanical implement.

I claim:

A driving device operated by the weight and muscular force of the human body, comprising a lever, a seat on said lever and to which working stroke is imparted by movement of the lever, a lever to support the feet, and having a working stroke, a driving shaft connected to one of said levers and links connecting said levers, certain of said links being arranged to support the arms, and having a working stroke, the working stroke of the seat carrying lever being the longest, that of the links supporting the arms the next longest and that of the foot lever the shortest, said seat, levers, links and shaft being arranged in a space bounded by the vertical planes of the seat carrying lever.

PETER BRETTRÄGER.